(12) United States Patent
Namuduri et al.

(10) Patent No.: US 11,984,561 B2
(45) Date of Patent: May 14, 2024

(54) BATTERY SWITCH CONTROL SYSTEMS AND METHODS

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 17/122,388

(22) Filed: Dec. 15, 2020

(65) Prior Publication Data

US 2022/0190395 A1 Jun. 16, 2022

(51) Int. Cl.
*H01M 10/42* (2006.01)
*H01M 10/44* (2006.01)
*H02J 7/00* (2006.01)

(52) U.S. Cl.
CPC ... *H01M 10/4235* (2013.01); *H01M 10/4257* (2013.01); *H01M 10/443* (2013.01); *H02J 7/0031* (2013.01); *H02J 7/007182* (2020.01); *H02J 7/007194* (2020.01); *H01M 2010/4271* (2013.01); *H01M 2220/20* (2013.01)

(58) Field of Classification Search
CPC ......... H01M 10/4235; H01M 10/4257; H01M 10/443; H01M 2220/20; H02J 7/007194; H02J 7/007182; H02J 7/0031
See application file for complete search history.

(56) References Cited

U.S. PATENT DOCUMENTS

| | | | |
|---|---|---|---|
| 10,369,896 B2 | 8/2019 | Namuduri et al. | |
| 10,665,398 B1 | 5/2020 | Namuduri et al. | |
| 10,675,991 B2 | 6/2020 | Hu et al. | |
| 2012/0091964 A1* | 4/2012 | Vance | H02J 7/0014 320/122 |
| 2014/0368132 A1* | 12/2014 | Schmidt | H02P 6/28 318/400.01 |
| 2015/0239363 A1* | 8/2015 | Brockerhoff | H02M 7/797 320/164 |
| 2018/0354375 A1* | 12/2018 | Dao | B60L 53/16 |

(Continued)

OTHER PUBLICATIONS

Carter Stanfield, "Reading Voltage Across Switches", Jun. 22, 2013, https://hvacrfundamentals.blogspot.com/2013/06/reading-voltage-across-switches.html (Year: 2013).*

(Continued)

*Primary Examiner* — Drew A Dunn
*Assistant Examiner* — Pamela J Jeppson

(57) ABSTRACT

A battery system includes a plurality of battery modules electrically connected in series. Each of the battery modules includes: one or more battery cells; a first switch connected between a positive reference potential of the one or more battery cells and a first node; and a second switch connected between the first node and a second node, where a negative reference potential of the one or more battery cells is connected to the second node. A management module is configured to: selectively close the first switches of the battery modules while the second switches are open; and selectively close the second switch of one of the battery modules while the first switch of the one of the battery modules is open.

20 Claims, 10 Drawing Sheets

(56) References Cited

U.S. PATENT DOCUMENTS

2019/0027784 A1* 1/2019 Nose ................. H01M 4/382
2019/0288345 A1* 9/2019 Hinterberger ........... H02J 7/36
2019/0359067 A1* 11/2019 Hu .................... B60L 53/11
2020/0321787 A1* 10/2020 Miller ............... H01M 10/441

OTHER PUBLICATIONS

Texas Instruments "Fundamentals of On-Resistance in Load Switches"—Jun. 2016 (Year: 2016).*
Infineon FF1500R12IE5P Data sheet—Jun. 2020 (Year: 2020).*
Jeff Shepard "30V MOSFETs feature less than 1 milliohm On-Resistance" EE Power Dec. 1, 2013 https://eepower.com/new-industry-products/30v-mosfets-feature-less-than-1-milliohm-on-resistance/# (Year: 2013).*
U.S. Appl. No. 16/656,084, filed Oct. 17, 2019, Namuduri et al.
U.S. Appl. No. 16/677,065, filed Nov. 7, 2019, Namuduri et al.
U.S. Appl. No. 16/819,872, filed Mar. 16, 2020, Namuduri et al.

* cited by examiner

BATTERY SWITCH CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle propulsion systems and more particularly to batteries, such as batteries of vehicles.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a battery system includes a plurality of battery modules electrically connected in series. Each of the battery modules includes: one or more battery cells; a first switch connected between a positive reference potential of the one or more battery cells and a first node; and a second switch connected between the first node and a second node, where a negative reference potential of the one or more battery cells is connected to the second node. A management module is configured to: selectively close the first switches of the battery modules while the second switches are open; and selectively close the second switch of one of the battery modules while the first switch of the one of the battery modules is open.

In further features, the management module is configured to open the first switch of the one of the battery modules and close the second switch of the one of the battery modules while the first switch of the one of the battery modules is open when a fault is present in the one of the battery modules.

In further features, the management module is configured to open the first switch of the one of the battery modules and close the second switch of the one of the battery modules while the first switch of the one of the battery modules is open when a state of charge of the one of the battery modules rises to a predetermined maximum state of charge during charging of the plurality of battery modules.

In further features, the state of charge of the one of the battery modules rises to the predetermined maximum state of charge before a second state of charge of a second one of the battery modules rises to the predetermined maximum state of charge.

In further features, the management module is configured to open the first switch of the one of the battery modules and close the second switch of the one of the battery modules while the first switch of the one of the battery modules is open when a voltage of the one of the battery modules rises to a predetermined maximum state of charge during charging of the plurality of battery modules.

In further features, the voltage of the one of the battery modules rises to the predetermined maximum voltage before a second voltage of a second one of the battery modules rises to the predetermined maximum voltage.

In further features, the management module is configured to open the first switch of the one of the battery modules and close the second switch of the one of the battery modules while the first switch of the one of the battery modules is open when a state of charge of the one of the battery modules decreases to a predetermined minimum state of charge during discharging of the plurality of battery modules.

In further features, the state of charge of the one of the battery modules decreases to the predetermined minimum state of charge before a second state of charge of a second one of the battery modules decreases to the predetermined minimum state of charge.

In further features, the management module is configured to open the first switch of the one of the battery modules and close the second switch of the one of the battery modules while the first switch of the one of the battery modules is open when a voltage of the one of the battery modules decreases to a predetermined minimum voltage during discharging of the plurality of battery modules.

In further features, the voltage of the one of the battery modules decreases to the predetermined minimum voltage before a second voltage of a second one of the battery modules decreases to the predetermined minimum voltage.

In further features, each of the battery modules further includes a driver configured to open and close the first and second switches based on commands from the management module.

In further features, each of the battery modules further includes: a temperature sensor configured to measure a temperature of that battery module; and a voltage sensor configured to measure a voltage of that battery module.

In further features, the management module is configured to open and close the first and second switches based on at least one of the temperatures of the battery modules and the voltages of the battery modules.

In further features, each of the battery modules further includes a current sensor configured to measure a current of that battery module and the management module is configured to open and close the first and second switches based on at least one of the temperatures of the battery modules, the currents of the battery modules, and the voltages of the battery modules.

In a feature, a vehicle system includes: the battery system; an electric motor configured to output drive torque for the vehicle; and an inverter that applies power from the battery modules to the electric motor.

In further features, the first and second switches are solid state switches.

In further features, the first and second switches are integrated within the battery modules, respectively.

In further features, the first and second switches have a voltage drop when closed that is less than a predetermined fraction of a voltage of one of the battery modules at a predetermined current.

In further features, the fraction is less than 1/100 of the voltage of the one of the battery modules.

In a feature, a method includes: selectively closing first switches of battery modules, respectively, while second switches of the battery modules, respectively, are open, where the battery modules are connected in series, and the battery modules each include: one or more battery cells; a first switch connected between a positive reference potential of the one or more battery cells and a first node; and a second switch connected between the first node and a second node, where a negative reference potential of the one or more battery cells is connected to the second node; and selectively closing the second switch of one of the battery modules while the first switch of the one of the battery modules is open.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A battery of a vehicle includes one or more strings of battery modules. Each string includes two or more battery modules connected in series. Each battery module includes one or more battery cells. If one of the battery modules of a string deteriorates, the entire string or battery may be impacted.

According to the present application, each battery module includes a series (first) switch and a bypass (second) switch. A management module monitors each of the battery modules and selectively actuates the first and second switches. Generally, the management module closes the series switches and maintains the bypass switches open such that all of the battery modules are connected in the string.

However, the management module may open the series switch of a battery module and close the bypass switch of the battery module under some circumstances. For example, the management module may open the series switch of a battery module and close the bypass switch of the battery module when the battery module includes a fault. The management module may open the series switch of a battery module and close the bypass switch of the battery module when a state of charge of the battery module reaches a predetermined maximum state of charge before one or more of the other battery modules reaches the predetermined maximum state of charge during charging. The management module may open the series switch of a battery module and close the bypass switch of the battery module when a state of charge of the battery module reaches a predetermined minimum state of charge before one or more of the other battery modules reaches the predetermined minimum state of charge during discharging. The above makes the battery more tolerant to faults of individual battery modules, increases life of the battery modules, and prevents over and under charging of individual battery modules.

Figure 1:
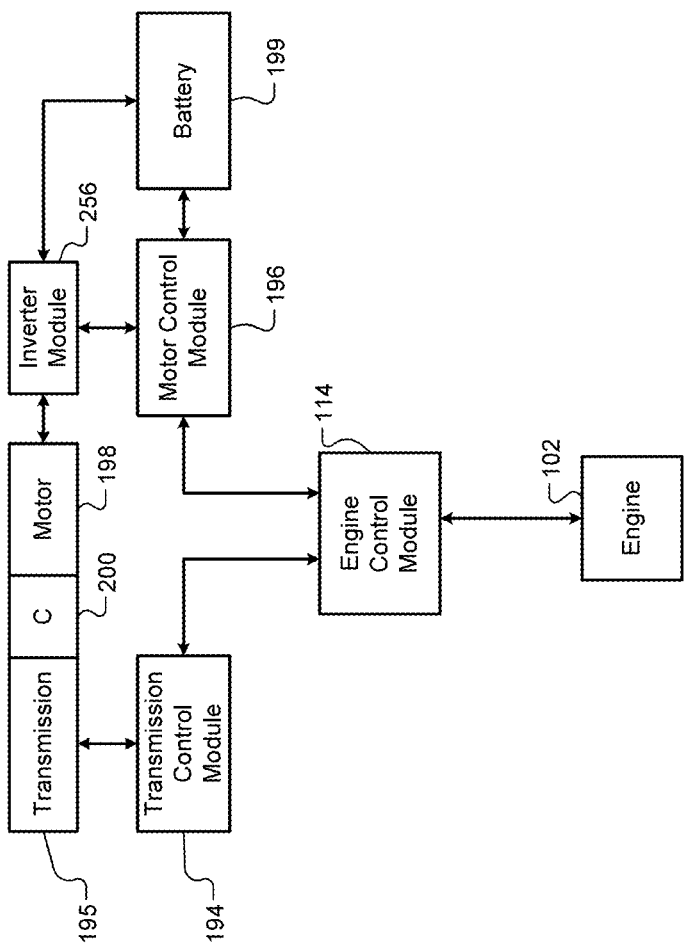
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine, fuel cell vehicles, autonomous vehicles, and other types of vehicles. Also, while the example of a vehicle is provided, the present application is also applicable to non-vehicle implementations including one or more switches.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
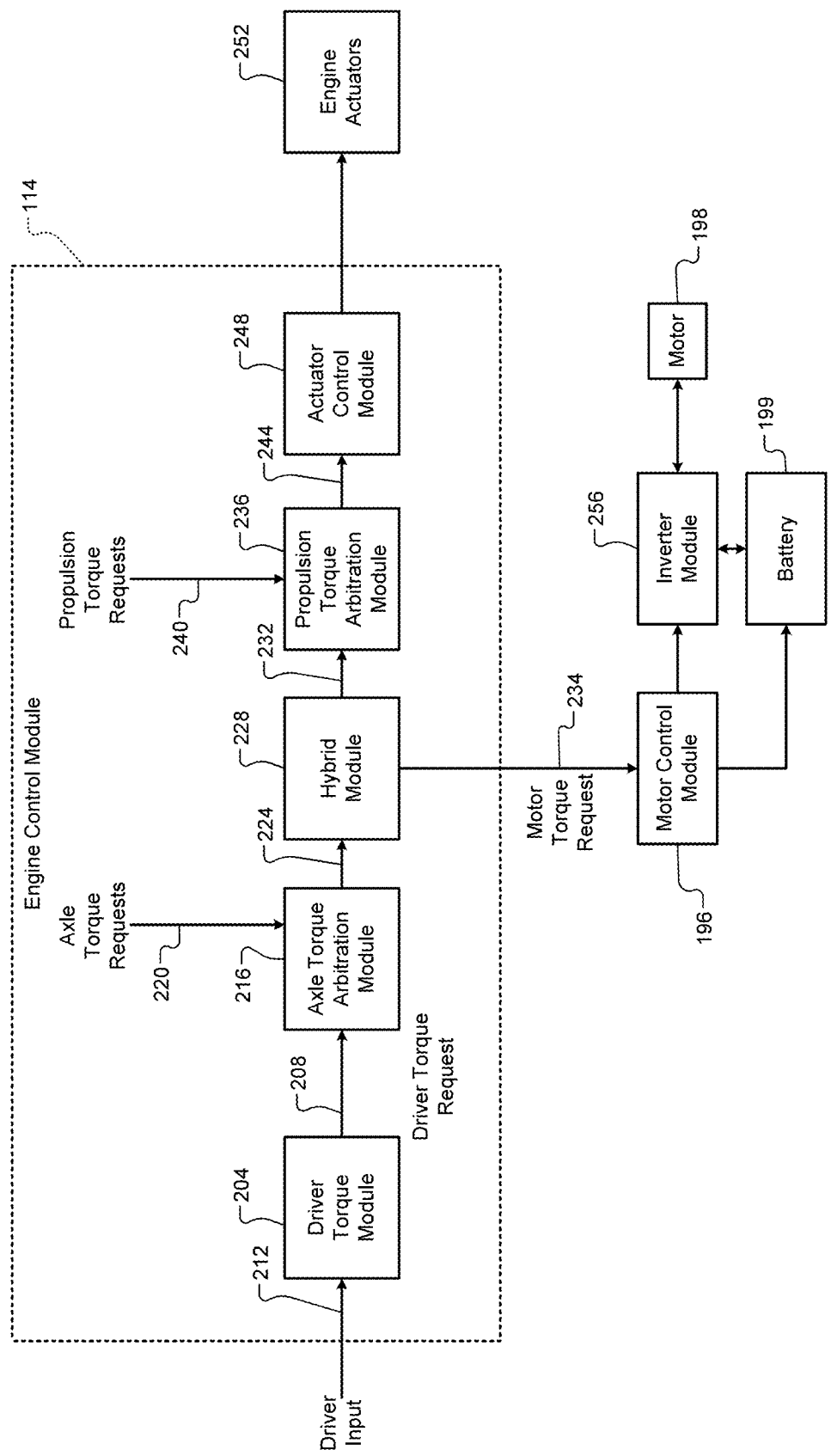
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 determines the driver torque request 208 based on one or more lookup tables that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 114 may be omitted, and the driver torque module 204 and the axle torque arbitration module 216 may be implemented within the motor control module 196.

In electric vehicles, the driver torque module 204 may input the driver torque request 208 to the motor control module 196 and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module 256 based on the motor torque request 234. Switching of the inverter module 256 controls power flow from the battery 199 to the electric motor 198. As such, switching of the inverter module 256 controls torque of the electric motor 198. The inverter module 256 also converts power generated by the electric motor 198 and outputs power to the battery 199, for example, to charge the battery 199.

The inverter module 256 includes a plurality of switches. The motor control module 196 switches the switches to convert DC power from the battery 199 into alternating current (AC) power and to apply the AC power to the electric motor 198 to drive the electric motor 198. For example, the inverter module 256 may convert the DC power from the battery 199 into n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the battery 199. The one or more filters may be implemented, for example, to filter power flow to and from the battery 199. As an example, a filter including one or more capacitors and resistors may be electrically connected in parallel with the inverter module 256 and the battery 199.

Figure 3:
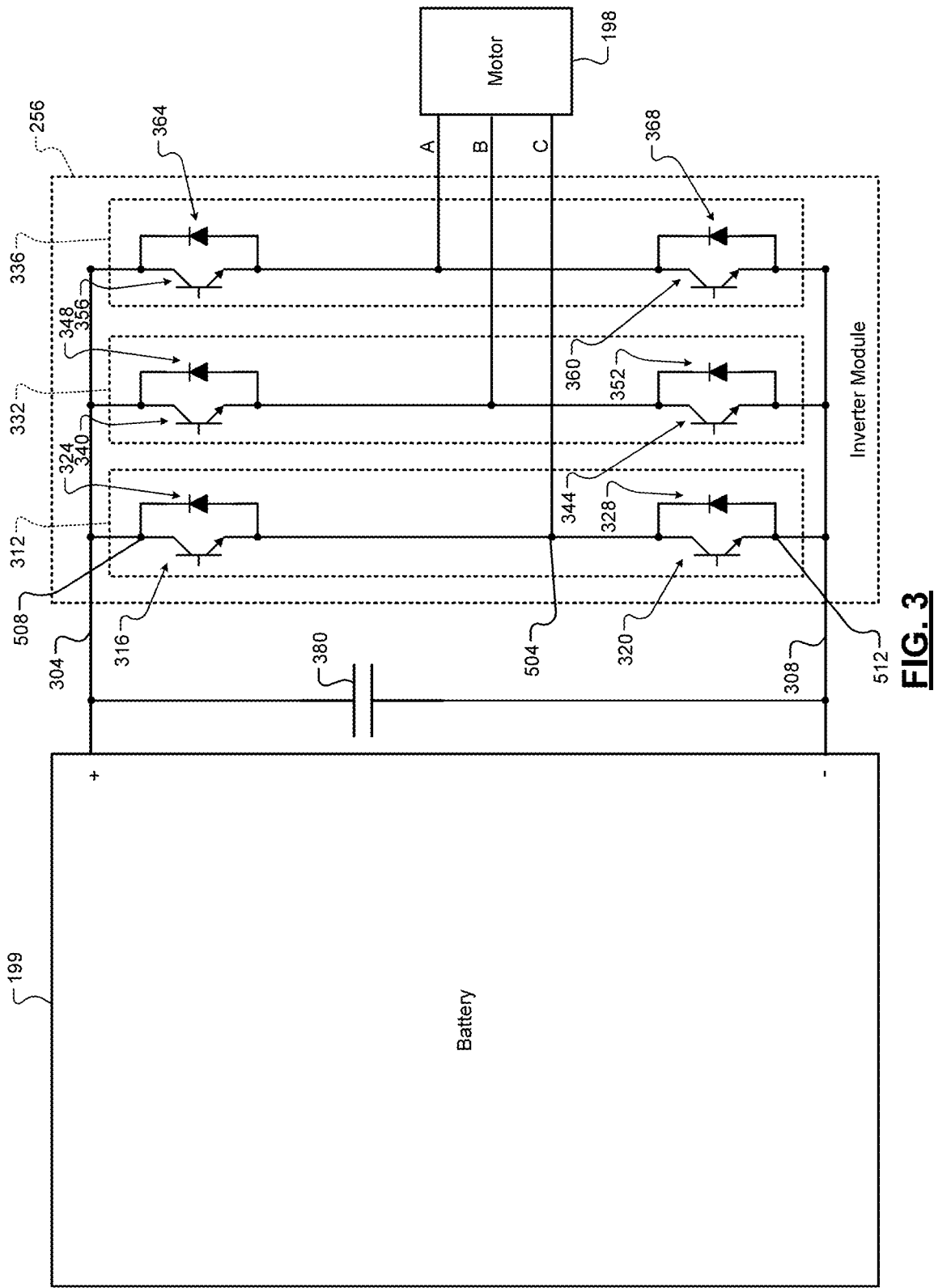
FIG. 3 is a schematic including an example implementation of an inverter module and a battery.

FIG. 3 includes a schematic including an example implementation of the inverter module 256 and the battery 199. The battery 199 may also be referred to as a battery pack. High (positive, DC+) and low (negative, DC−) sides 304 and 308 are connected to positive and negative terminals, respectively, of the battery 199. The inverter module 256 is also connected between the high and low sides 304 and 308.

The inverter module 256 includes three legs, one leg connected to each phase of the electric motor 198. A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 is connected to a first phase (e.g., a) of the electric motor 198.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the battery 199. This charges the battery 199. The diodes 324 and 328 form one phase of a three-phase rectifier.

The inverter module 256 also includes second and third legs 332 and 336. The second and third legs 332 and 336 may be (circuitry wise) similar or identical to the first leg 312. In other words, the second and third legs 332 and 336 may each include respective switches and diodes like the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 is connected to a second stator winding (e.g., b) of the electric motor 198. The third leg 336 includes switches 356 and 360 and anti-parallel diodes 364 and 368. A node connected to the second terminal of the switch 356 and the first terminal of the switch 360 is connected to a third stator winding (e.g., c) of the electric motor 198.

Figure 4:
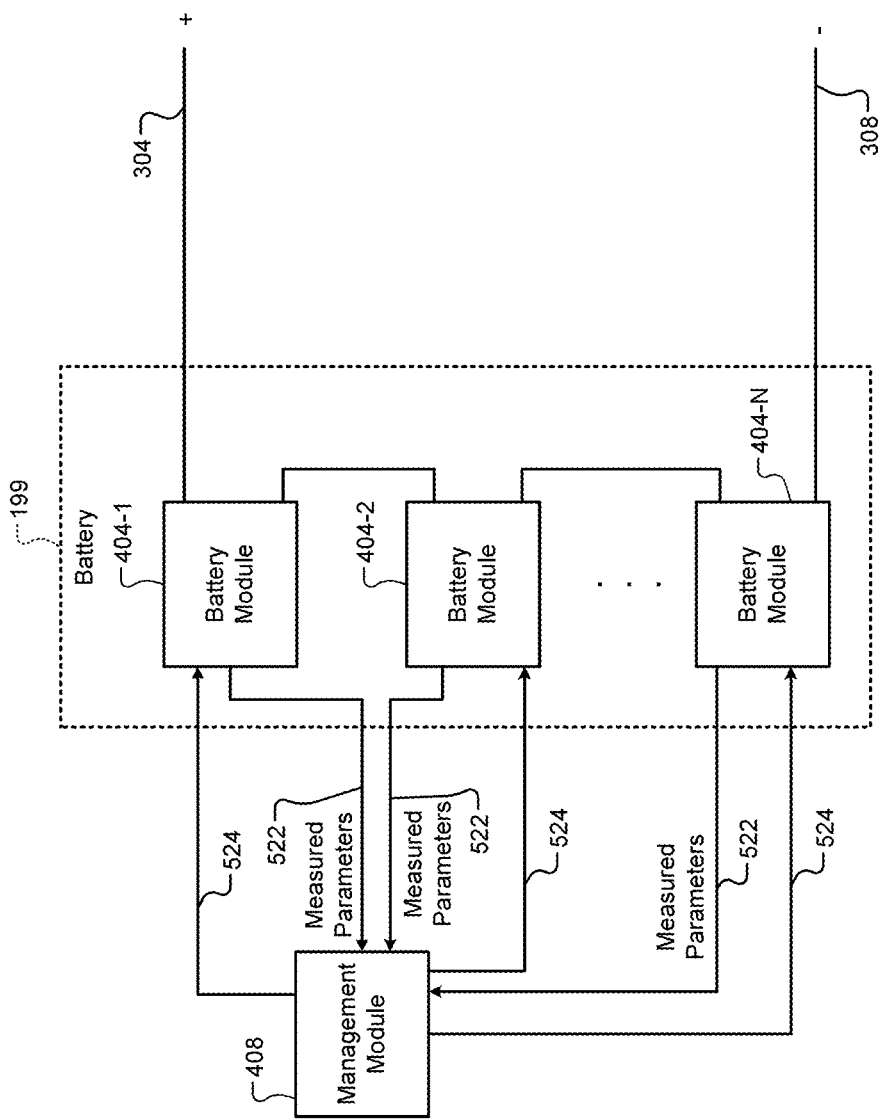
FIG. 4 is functional block diagram of an example battery system.

FIG. 4 is a functional block diagram of an example battery system. The battery 199 includes a string of multiple battery modules, such as battery modules 404-1, 404-2, . . . , 4-4-N (collectively battery modules 404). N is an integer greater than two. The battery modules 404 of the string are electrically connected in series. A positive terminal of a first one of the battery modules 404 (in this example battery module 404-1) is connected to the high side 304, and a negative terminal of a last one of the battery modules 404 (in this example battery module 404-N) is connected to the low side 308. While the example of the battery 199 including one string of battery modules is provided, the battery 199 may include one or more other strings of battery modules. The other strings of battery modules may be connected in series with the string shown, in parallel with the string shown, or include at least one string connected in series and at least one string connected in parallel. A current sensor 406 may measure a current through a set of battery modules connected in series. The measured current from the current sensor 406 may be provided, for example, to state of charge estimators for the battery modules of the series. The current sensor 406 may be provided, for example, instead of each battery module including its own current sensor.

Each of the battery modules 404 includes a single battery cell or two or more battery cells that are electrically connected. Multiple battery cells of a battery module 404 may be electrically connected in series, parallel, or a combination of series and parallel.

Each of the battery modules 404 includes sensors that measure its present operating parameters, such as temperature, voltage, and current. A management module 408 receives the measured parameters and controls one or more operating parameters of the battery modules 404 based on the measured parameters of the battery modules 404, respectively.

Each of the battery modules 404 includes a series switch and a bypass switch. The management module 408 (via drivers of the battery modules 404) closes the series switches of battery modules 404 and opens the bypass switches during normal operation of the battery modules 404. The management module 408, however, opens the series switch and closes the bypass switch of one of the battery modules 404 when the battery module 404 is faulty, fully charged when one or more other battery modules 404 are not fully charged during charging, or fully discharged when one or more other battery modules are not fully discharged during discharging. In this manner, the battery modules 404 can be individually bypassed to maximize capacity of the battery 199, allow for full charging and discharging of each battery module. This also prolongs operating time and increases reliability of the battery 199 and renders the battery 199 more tolerant to failures of one or more battery modules 404.

Figure 5:
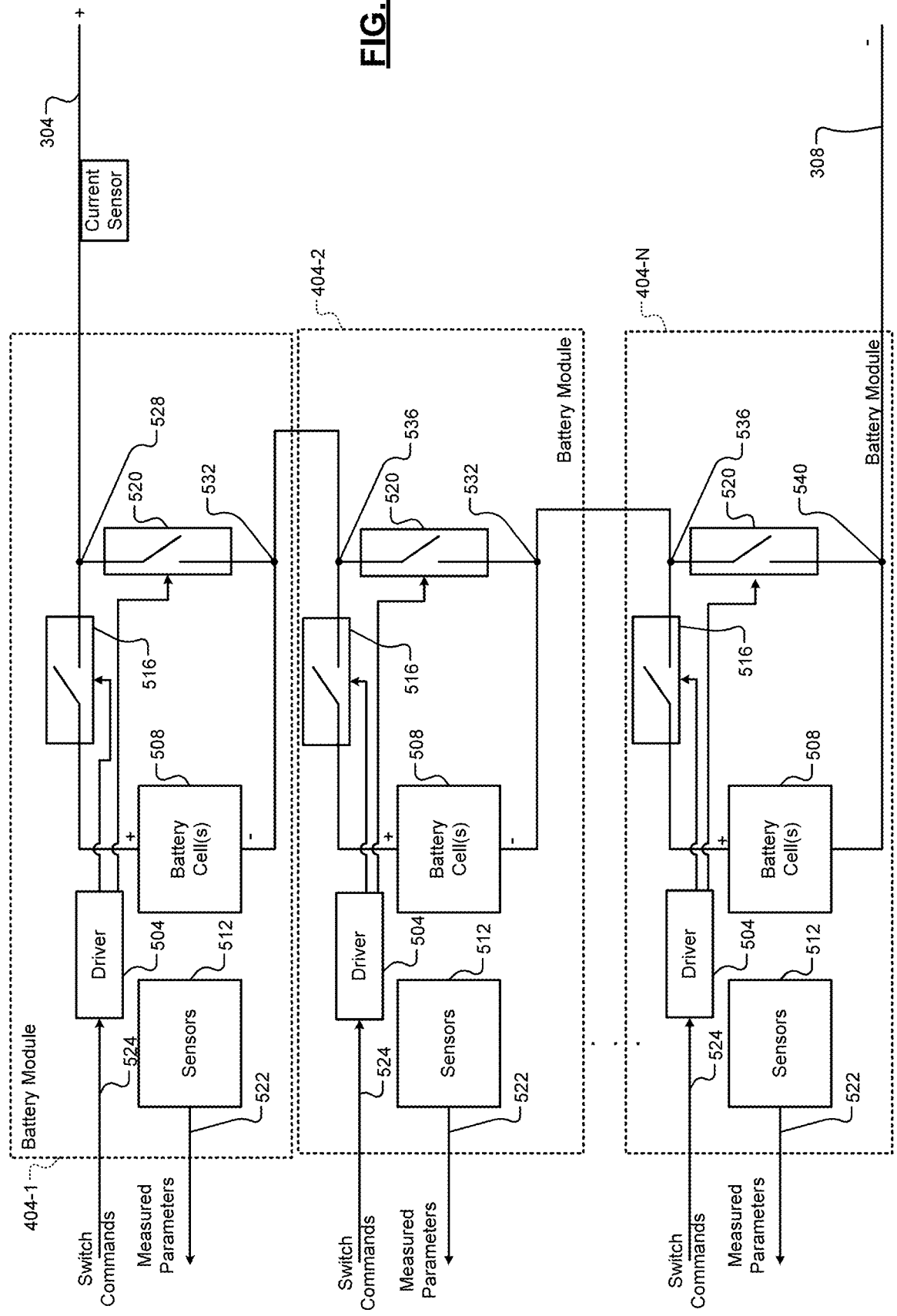
FIG. 5 is a functional block diagram of example implementations of battery modules.

FIG. 5 is a functional block diagram of example implementations of the battery modules 404. Each of the battery modules 404 includes a driver 504, one or more battery cells 508, sensors 512, a series switch 516, and a bypass switch 520.

The sensors 512 of a battery module include a temperature sensor, a current sensor, and a voltage sensor. The temperature sensor measures a temperature of the battery module. The voltage sensor measures a voltage of the battery cell(s) 508 of the battery module. The current sensor measures a current to or from the battery cell(s) 508 of the battery module. The sensors 512 may also include one or more other types of sensors. The sensors 512 transmit the measured parameters 522 (e.g., voltage, current, temperature) of the battery module to the management module 408.

The driver 504 of a battery module controls switching of the series and bypass switches 516 and 520 of the battery module based on switch commands 524 for the bypass switches 516 and 520 of the battery module. The management module 408 generates the switch commands 524 for the battery modules 404, respectively, for example based on the measured parameters 522.

The series switch 516 of the battery module 404-1 is connected between an input node 528 and a positive (+) reference potential of the battery cell(s) 508 of the battery module 404-1. The input node 528 is connected to the high side 304. The negative (−) reference potential of the battery cell(s) 508 of the battery module 404-1 is connected to an output node 532. The bypass switch 520 of the battery module 404-1 is connected between the input node 528 and the output node 532.

Input nodes 536 of the other battery modules 404 are connected to the output nodes of the previous battery modules 404, respectively. For example, the input node 536 of the battery module 404-2 is connected to the output node 532 of the battery module 404-1. The series switches 516 of the other battery modules are connected between the input nodes 536 of those battery modules, respectively, and the positive (+) reference potentials of the battery cell(s) 508 of those battery modules. The bypass switches 520 of the other battery modules are connected between the input nodes 536 and the output nodes of those battery modules, respectively. Output node 540 of the last battery module of the string (in this example battery module 404-N) is connected to the low side 308.

The management module 408 controls opening and closing of the series and bypass switches 516 and 520 to independently connect and disconnect ones of the battery cells 508 in the string. The management module 408 opens the bypass switch 520 of a battery module when the series switch 516 of that battery module is closed and closes the bypass switch of a battery module when the series switch 516 of that battery module is open.

Generally, the management module 408 may close all of the series switches 516 and open all of the bypass switches 520. However, the management module 408 may close the bypass switch 520 of a battery module and open the series switch 516 of that battery module under some circumstances. Closing the bypass switch 520 and opening the series switch 516 of a battery module electrically disconnects the battery cell(s) 508 of that battery module from the string.

For example, the management module 408 may open the series switch 516 of a battery module and close the bypass switch 520 of the battery module when the battery module is diagnosed as including a fault. The management module 408 may open the series switch 516 of a battery module and close the bypass switch 520 of the battery module when a state of charge of the battery module reaches a predetermined maximum state of charge during charging. The management module 408 may open the series switch 516 of a battery module and close the bypass switch 520 of the battery module when a state of charge of the battery module reaches a predetermined minimum state of charge during discharging. The management module 408 may determine the state of charge of a battery module based on the voltage and/or the current of the battery module, for example, using one or more equations and/or lookup tables that relate voltages and/or currents to states of charge.

In the example of each battery module including a single battery cell, the series and bypass switches 516 and 520 may be, for example, silicon, silicon carbide (SiC), or gallium nitride (GaN) MOSFETs (e.g., dies) or another suitable type of switch. The series and bypass switches 516 and 520 may have a blocking voltage of greater than or equal to approximately 25 volts or another suitable blocking voltage. The series and bypass switches 516 and 520 may have an on resistance (Ron) of approximately 0.2 mOhm or another suitable on resistance. The series and bypass switches 516 and 520 may have a peak current of at least approximately 1500 amps or another suitable peak current. The series and bypass switches 516 and 520 may have switching times of less than approximately 1 microsecond or another suitable switching time. The series and bypass switches 516 and 520 may be solid state switches. The series and bypass switches 516 may have a voltage drop (when closed) that is less than a predetermined fraction of the battery module voltage at a predetermined current. The predetermined fraction may be, for example, 1/100 or less. The series and bypass switches 516 and 520 may be integrated within the battery modules.

In the example of each battery module including two or more battery cells, the series and bypass switches 516 and 520 may be, for example, silicon, silicon carbide (SiC), or gallium nitride (GaN) MOSFETs (e.g., dies) or another suitable type of switch. The series and bypass switches 516 and 520 may have a blocking voltage of greater than or equal to approximately 80 volts or another suitable blocking voltage. The series and bypass switches 516 and 520 may have an on resistance (Ron) of approximately 0.6 mOhm or another suitable on resistance. The series and bypass switches 516 and 520 may have a peak current of at least approximately 1500 amps or another suitable peak current. The series and bypass switches 516 and 520 may have switching times of less than approximately 1 microsecond or another suitable switching time. Approximately as used herein may mean+/−10%.

Figure 6:
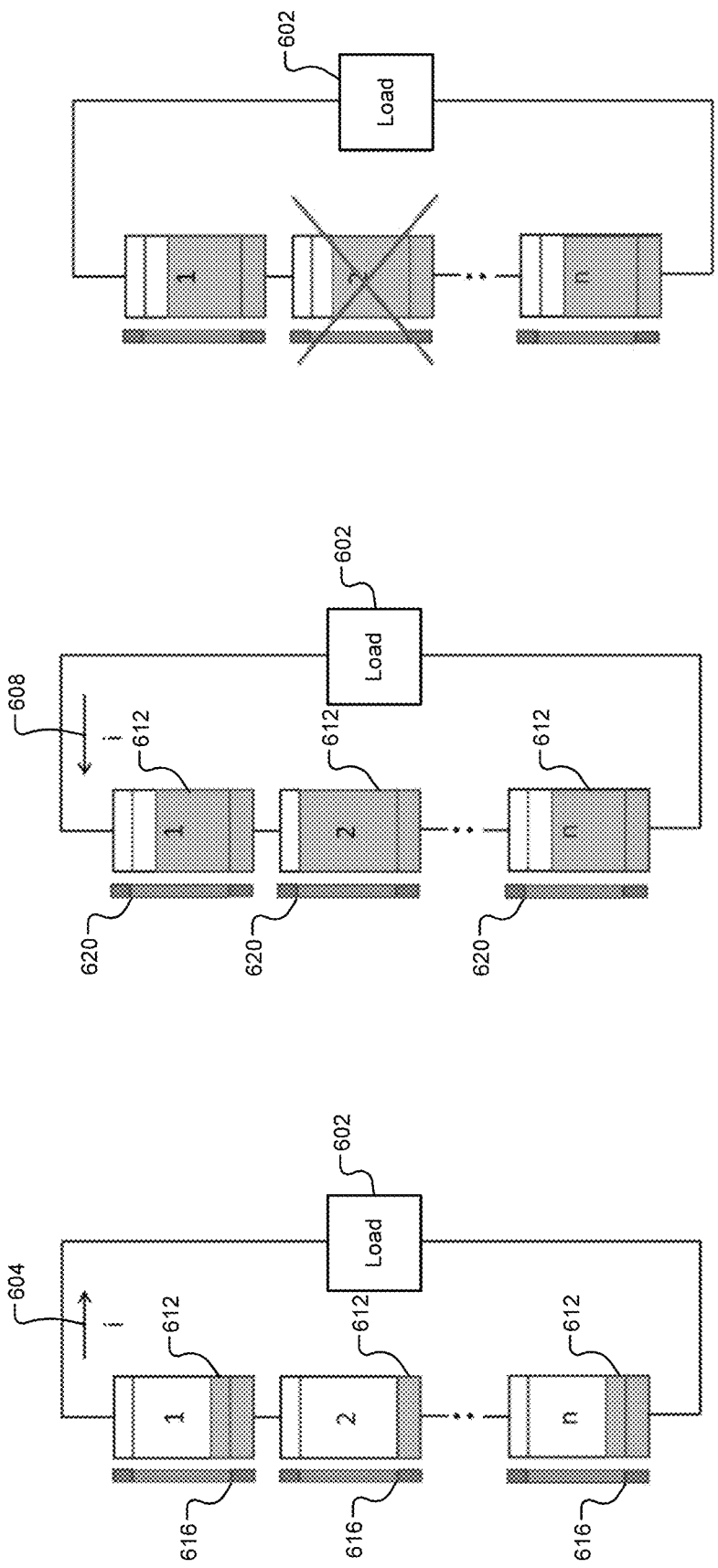
FIG. 6 includes example illustrations of discharging (left), charging (middle), and state (right) of a string of battery modules.

FIG. 6 includes example illustrations of discharging (left), charging (middle), and state (right) of the string of battery modules 404. 602 represents a load 602, such as the inverter module 256 and the electric motor 198. Arrows 604 and 608 illustrate current flow.

On the left of FIG. 6, one or more of the battery modules 404 may discharge at different rates. Blocks 612 indicate the state of charge of each of the battery modules 404 (1, 2, . . . , n). 616 indicates a predetermined minimum state of charge of the battery modules 404. As shown on the left of FIG. 6, the battery module 404-2 (simply numbered 2 in FIG. 6) is more discharged than the battery modules 404-1 and 404-n (simply numbered 2 and n in FIG. 6). The battery module 404-2 is discharged to the predetermined minimum state of charge. The management module 408 may therefore open the series switch and close the bypass switch of the battery module 404-2. The management module 408 may leave the series switches of the other battery modules 404-1 and 404-n closed to continue discharging from the battery modules 404-1 and 404-n.

In the middle of FIG. 6, one or more of the battery modules 404 may charge at different rates. 620 indicates a predetermined maximum state of charge of the battery modules 404. As shown in the middle of FIG. 6, the battery module 404-2 is more charged than the battery modules 404-1 and 404-n (simply numbered 2 and n in FIG. 6). The battery module 404-2 is charged to the predetermined maximum state of charge. The management module 408 may therefore open the series switch and close the bypass switch of the battery module 404-2. The management module 408 may leave the series switches of the other battery modules 404-1 and 404-n closed to continue charging the battery modules 404-1 and 404-n.

On the right of FIG. 6, one or more of the battery modules 404 may be diagnosed as being faulty under some circumstances. For example, the management module 408 may diagnose a battery module as faulty, for example, when the state of charge of that battery module becomes greater than the predetermined minimum or maximum state of charge, when the battery module charges at faster than a predetermined rate, when the battery module discharges at faster than a predetermined rate, or when one or more other fault conditions occur. The right of FIG. 6 illustrates that a fault is present in the battery module 404-2. The management module 408 may therefore open the series switch and close the bypass switch of the battery module 404-2. The management module 408 may leave the series switches of the other battery modules 404-1 and 404-n closed to continue charging the battery modules 404-1 and 404-n.

Figure 7:
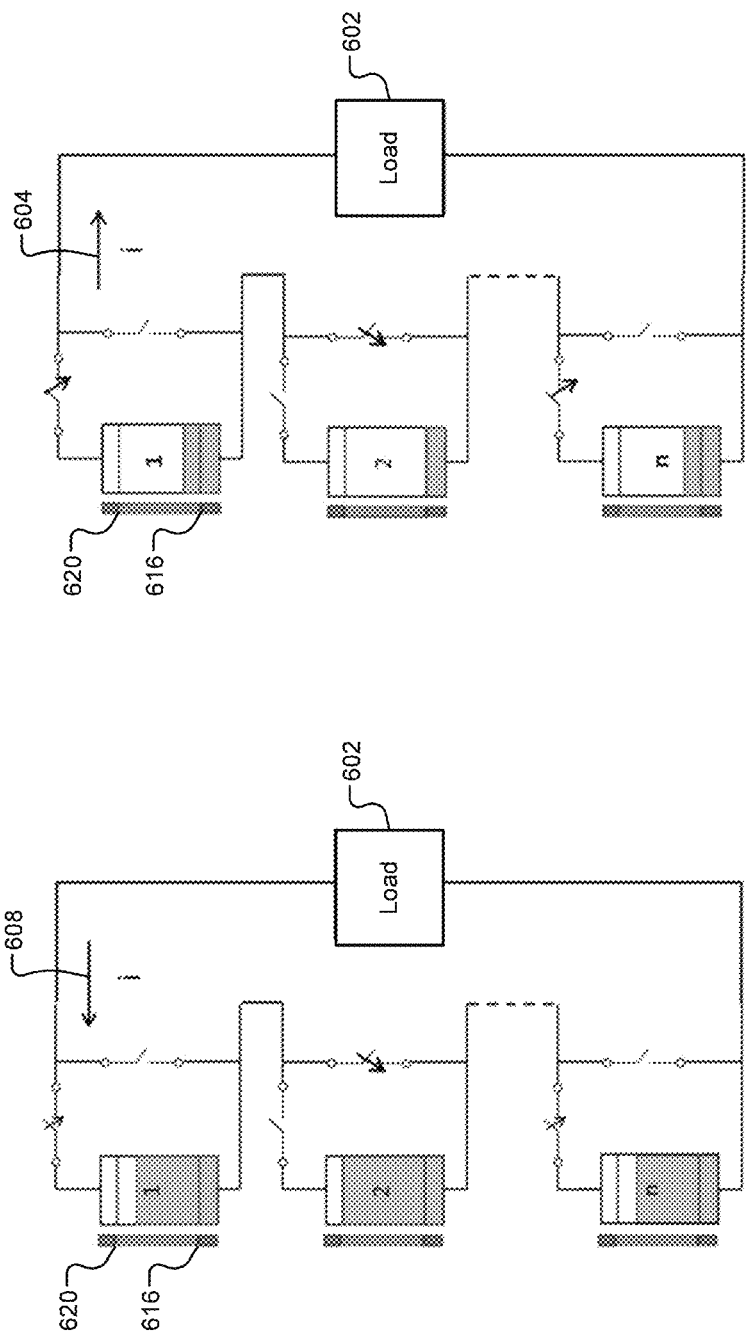
FIG. 7 depicts example switch states during charging and discharging.

FIG. 7 depicts example switch states during charging and discharging. As illustrated on the left of FIG. 7, when the battery module 404-2 (simply illustrated by 2 in FIG. 7) reaches the predetermined maximum state of charge during charging, the management module 408 may open the series switch of the battery module 404-2 and close the bypass switch of the battery module 404-2. As illustrated on the right of FIG. 7, when the battery module 404-2 reaches the predetermined minimum state of charge during discharging, the management module 408 may open the series switch of the battery module 404-2 and close the bypass switch of the battery module 404-2.

Figure 8:
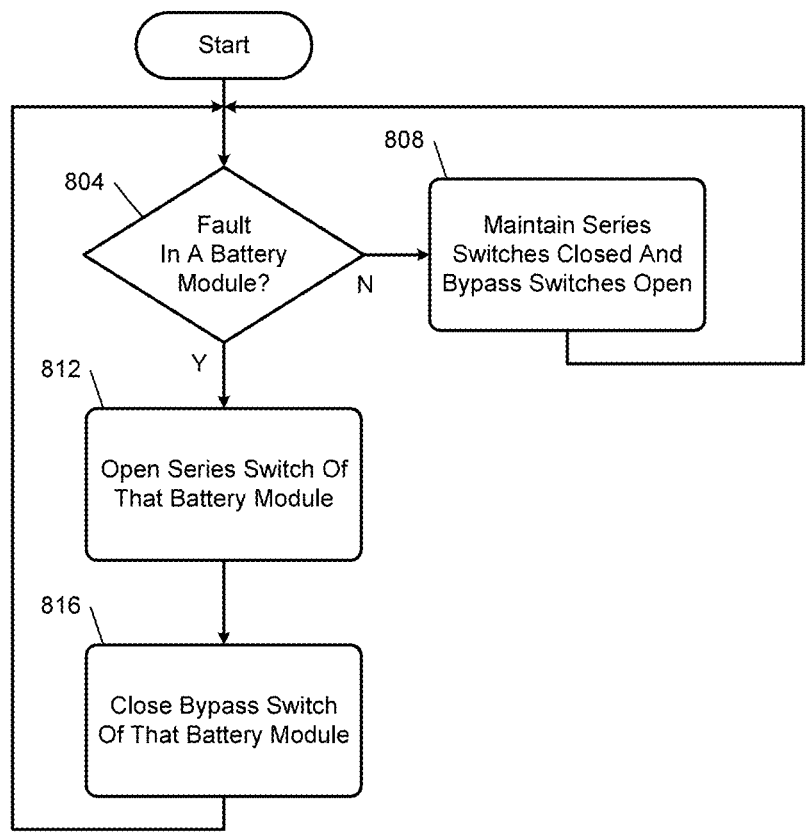
FIGS. 8-10 include flowchart depicting example methods of controlling switches of battery modules.

FIG. 8 is a flowchart depicting a method of controlling the switches of the battery modules. Control begins with 804 where the management module 408 determines whether a fault has been diagnosed in one of the battery modules 404. If 804 is false, the management module 408 maintains the series switches 516 of the battery modules 404 closed and the bypass switches 520 of the battery modules 404 open at 808, and control returns to 804. If 804 is true control continues with 812.

At 812, the management module 408 opens the series switch 516 of the battery module 404 that has the fault. If multiple of the battery modules 404 have a fault, the management module 408 opens the series switches 516 of those battery modules. At 816, the management module 408 closes the bypass switch(es) 520 of the one or more battery modules that have a fault.

Figure 9:
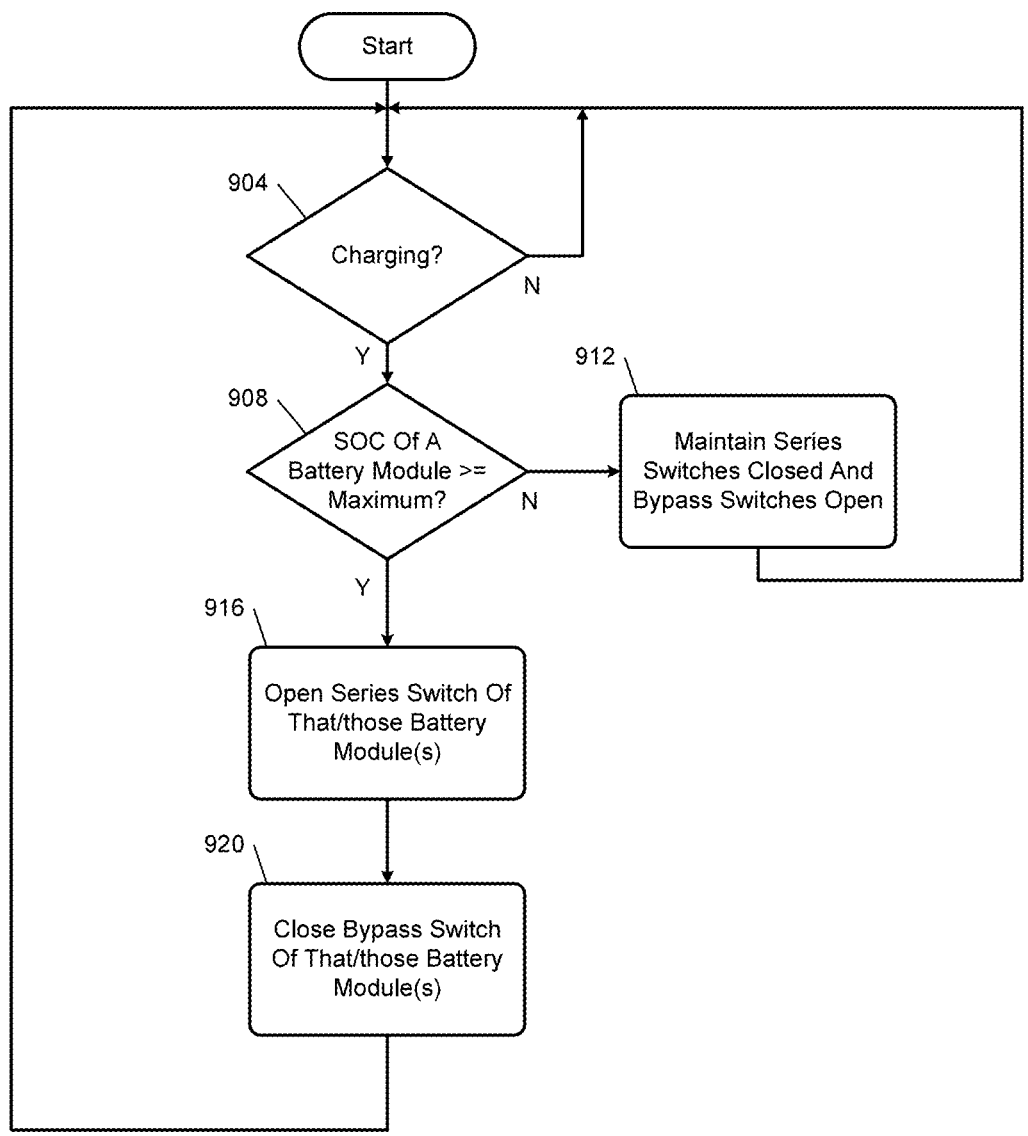

FIG. 9 is a flowchart depicting an example method of controlling the switches of the battery modules. At 904, the management module 408 determines whether charging of the string of battery modules 404 is occurring. If 904 is true, control continues with 908. If 904 is false, control may remain at 904.

At 908, the management module 408 determines whether the state of charge of one or more of the battery modules is greater than or equal to the predetermined maximum state of charge (e.g., approximately 92 percent or another suitable value). One or more other battery modules may have a state of charge that is less than the predetermined maximum state of charge. If 908 is false, the management module 408 may maintain the series switches 516 of all of the battery modules 404 closed and the bypass switches 520 of all of the battery modules 404 open at 912, and control returns to 904. If 908 is true, control continues with 916.

At 916, the management module 408 opens the series switch(es) 516 of the one or more battery modules 404 that have a state of charge that is greater than or equal to the predetermined maximum state of charge. The management module 408 maintains the series switch(es) 516 of all of the other battery modules 404 closed. At 920, the management module 408 closes the bypass switch(es) 520 of the one or more battery modules 404 that have a state of charge that is greater than or equal to the predetermined maximum state of charge. The management module 408 maintains the bypass switch(es) 520 of all of the other battery modules 404 open.

The ones of the battery modules 404 that have not yet reached the predetermined maximum state of charge can therefore continue to be charged. Control returns to 904.

Figure 10:
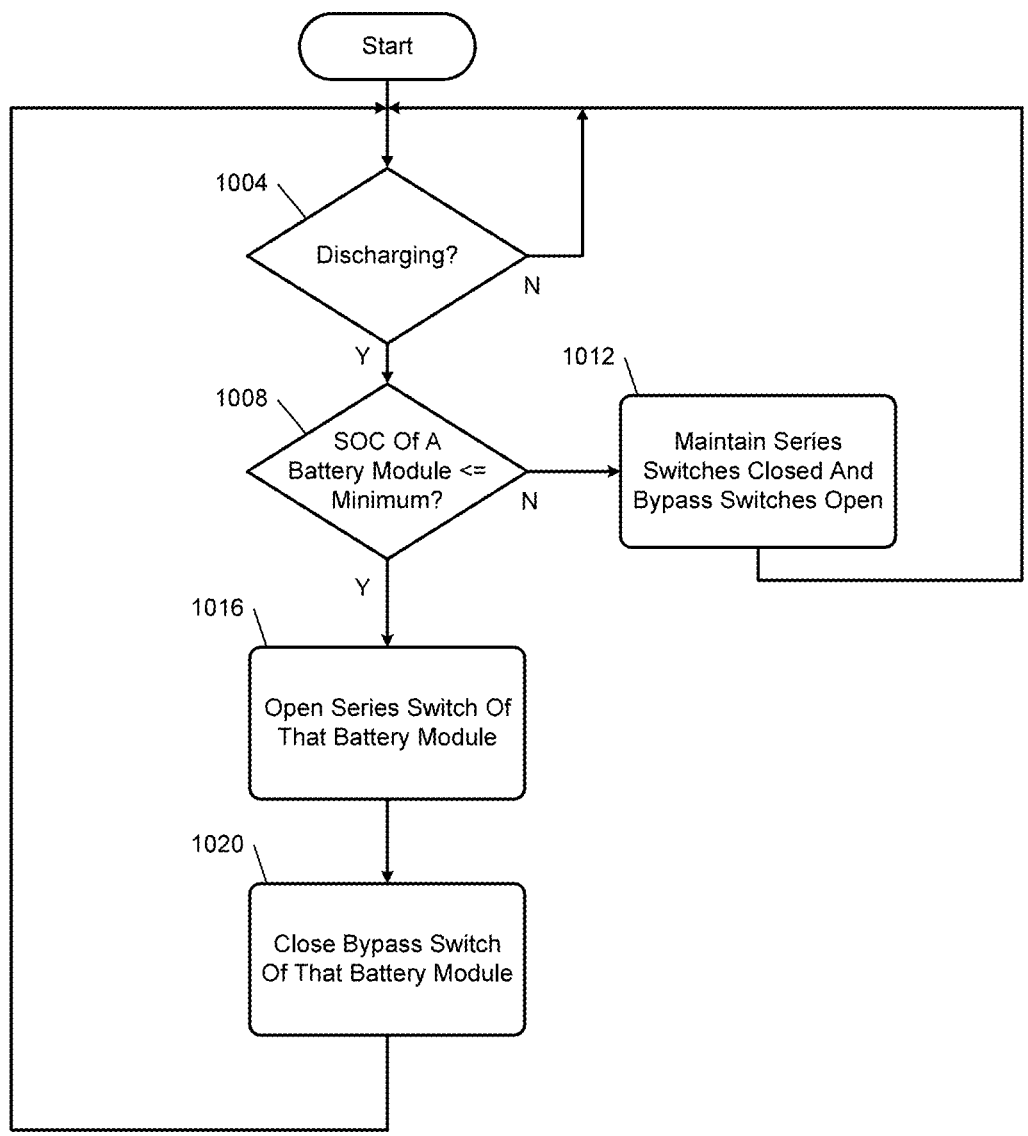

FIG. 10 is a flowchart depicting an example method of controlling the switches of the battery modules. At 1004, the management module 408 determines whether discharging of the string of battery modules 404 is occurring. If 1004 is true, control continues with 1008. If 1004 is false, control may remain at 1004.

At 1008, the management module 408 determines whether the state of charge of one or more of the battery modules 404 is less than or equal to the predetermined minimum state of charge (e.g., approximately 10 percent or another suitable value). One or more other battery modules may have a state of charge that is greater than the predetermined minimum state of charge. If 1008 is false, the management module 408 may maintain the series switches 516 of all of the battery modules 404 closed and the bypass switches 520 of all of the battery modules 404 open at 1012, and control returns to 1004. If 1008 is true, control continues with 1016.

At 1016, the management module 408 opens the series switch(es) 516 of the one or more battery modules 404 that have a state of charge that is less than or equal to the predetermined minimum state of charge. The management module 408 maintains the series switch(es) 516 of all of the other battery modules 404 closed. At 1020, the management module 408 closes the bypass switch(es) 520 of the one or more battery modules 404 that have a state of charge that is less than or equal to the predetermined minimum state of charge. The management module 408 maintains the bypass switch(es) 520 of all of the other battery modules 404 open. The ones of the battery modules 404 that have not yet reached the predetermined minimum state of charge can therefore continue to be discharged. Control returns to 1004.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery system comprising:
   a plurality of battery modules electrically connected in series,
   wherein each of the battery modules includes:
   one or more battery cells;
   a first switch connected between a positive reference potential of the one or more battery cells and a first node; and
   a second switch connected between the first node and a second node,
   wherein a negative reference potential of the one or more battery cells is connected to the second node, and
   wherein the first and second switches each have a blocking voltage of at least 25 volts, are each one of silicon carbide and gallium nitride metal oxide semiconductor field effect transistors (MOSFETs), and each have an on resistance of approximately 0.2 mOhm; and
   a management module configured to:
   selectively close the first switches of the battery modules while the second switches are open; and
   selectively close the second switch of a first one of the battery modules while the first switch of the first one of the battery modules is open;

open the first switch of the first one of the battery modules and close the second switch of the first one of the battery modules while the first switch of the first one of the battery modules is open when a first state of charge of the first one of the battery modules rises to a predetermined maximum state of charge during charging of the plurality of battery modules;

while the first switch of the first one of the battery modules is open and the second switch of the first one of the battery modules is closed during the charging of the plurality of battery modules, close the first switch of a second one of the battery modules and open the second switch of the second one of the battery modules until a second state of charge of the second one of the battery modules rises to the predetermined maximum state of charge; and open the first switch of the second one of the battery modules and close the second switch of the second one of the battery modules when the second state of charge of the second one of the battery modules reaches the predetermined maximum state of charge during the charging of the plurality of battery modules.

2. The battery system of claim 1 wherein the management module is configured to open the first switch of the one of the battery modules and close the second switch of the first one of the battery modules while the first switch of the first one of the battery modules is open when a fault is present in the first one of the battery modules.

3. The battery system of claim 1 wherein the management module is configured to open the first switch of the first one of the battery modules and close the second switch of the first one of the battery modules while the first switch of the first one of the battery modules is open when a voltage of the first one of the battery modules rises to a predetermined maximum voltage during charging of the plurality of battery modules.

4. The battery system of claim 3 wherein the voltage of the first one of the battery modules rises to the predetermined maximum voltage before a second voltage of the second one of the battery modules rises to the predetermined maximum voltage.

5. The battery system of claim 1 wherein the management module is configured to open the first switch of the first one of the battery modules and close the second switch of the first one of the battery modules while the first switch of the first one of the battery modules is open when a state of charge of the first one of the battery modules decreases to a predetermined minimum state of charge during discharging of the plurality of battery modules.

6. The battery system of claim 5 wherein the state of charge of the first one of the battery modules decreases to the predetermined minimum state of charge before a second state of charge of the second one of the battery modules decreases to the predetermined minimum state of charge.

7. The battery system of claim 1 wherein the management module is configured to open the first switch of the first one of the battery modules and close the second switch of the first one of the battery modules while the first switch of the first one of the battery modules is open when a voltage of the first one of the battery modules decreases to a predetermined minimum voltage during discharging of the plurality of battery modules.

8. The battery system of claim 7 wherein the voltage of the first one of the battery modules decreases to the predetermined minimum voltage before a second voltage of the second one of the battery modules decreases to the predetermined minimum voltage.

9. The battery system of claim 1 wherein each of the battery modules further includes a driver configured to open and close the first and second switches based on commands from the management module.

10. The battery system of claim 1 wherein each of the battery modules further includes:
a temperature sensor configured to measure a temperature of that battery module; and
a voltage sensor configured to measure a voltage of that battery module.

11. The battery system of claim 10 wherein the management module is configured to open and close the first and second switches based on at least one of the temperatures of the battery modules and the voltages of the battery modules.

12. The battery system of claim 10 wherein each of the battery modules further includes a current sensor configured to measure a current of that battery module and the management module is configured to open and close the first and second switches based on at least one of the temperatures of the battery modules, the currents of the battery modules, and the voltages of the battery modules.

13. A vehicle system comprising:
the battery system of claim 1;
an electric motor configured to output drive torque for the vehicle; and
an inverter that applies power from the battery modules to the electric motor.

14. The battery system of claim 1 wherein the first and second switches are solid state switches.

15. The battery system of claim 1 wherein the first and second switches are integrated within the battery modules, respectively.

16. The battery system of claim 1 wherein the first and second switches have a voltage drop when closed that is less than a predetermined fraction of a voltage of one of the battery modules at a predetermined current.

17. The battery system of claim 16, wherein the predetermined fraction is less than $1/100$ of the voltage of the one of the battery modules.

18. The battery system of claim 1 wherein the first and second switches each have a peak current of at least approximately 1500 amps, and the first and second switches each have switching times of less than approximately 1 microsecond.

19. A method comprising:
selectively closing first switches of battery modules, respectively, while second switches of the battery modules, respectively, are open,
wherein the battery modules are connected in series, and the battery modules each include:
one or more battery cells;
a first switch connected between a positive reference potential of the one or more battery cells and a first node; and
a second switch connected between the first node and a second node,
wherein a negative reference potential of the one or more battery cells is connected to the second node, and
wherein the first and second switches each have a blocking voltage of at least 25 volts, are each one of silicon carbide and gallium nitride metal oxide semiconductor field effect transistors (MOSFETs), and each have an on resistance of approximately 0.2 mOhm;

selectively closing the second switch of a first one of the battery modules while the first switch of the first one of the battery modules is open;

opening the first switch of the first one of the battery modules and closing the second switch of the first one of the battery modules while the first switch of the first one of the battery modules is open when a first state of charge of the first one of the battery modules rises to a predetermined maximum state of charge during charging of the plurality of battery modules;

while the first switch of the first one of the battery modules is open and the second switch of the first one of the battery modules is closed during the charging of the plurality of battery modules, closing the first switch of a second one of the battery modules and opening the second switch of the second one of the battery modules until a second state of charge of the second one of the battery modules rises to the predetermined maximum state of charge; and opening the first switch of the second one of the battery modules and closing the second switch of the second one of the battery modules when the second state of charge of the second one of the battery modules reaches the predetermined maximum state of charge during the charging of the plurality of battery modules.

20. The method of claim 19 wherein the first and second switches each have a peak current of at least approximately 1500 amps, and the first and second switches each have switching times of less than approximately 1 microsecond.

* * * * *